Feb. 21, 1950 M. KAPLOWITZ 2,498,277
CAMERA SHUTTER AND SYNCHRONIZING SWITCH
Filed May 21, 1946 2 Sheets-Sheet 2
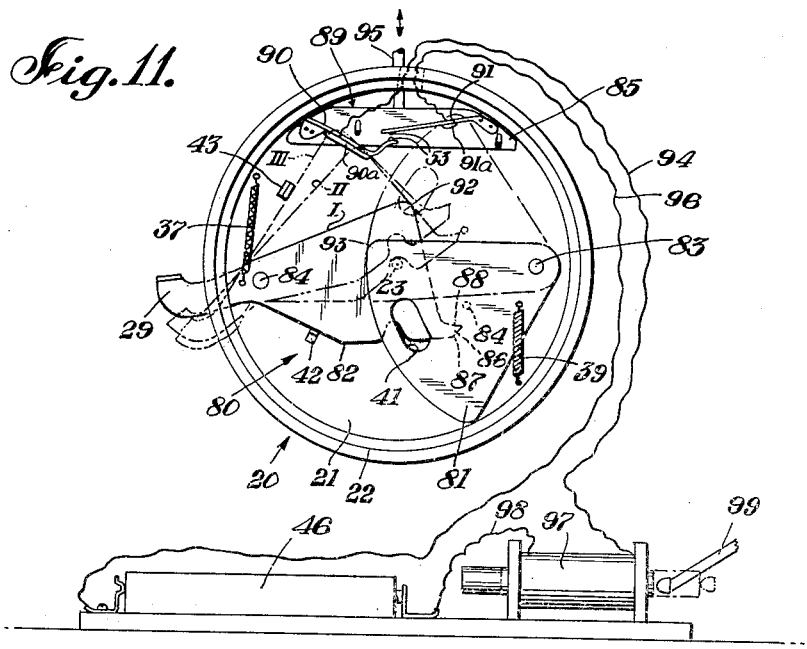
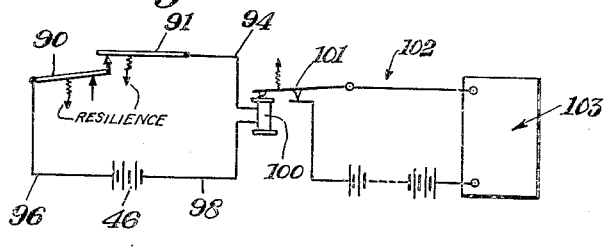
INVENTOR:
MORRIS KAPLOWITZ
BY
Ernest F. Marmorek
his AGENT Patented Feb. 21, 1950

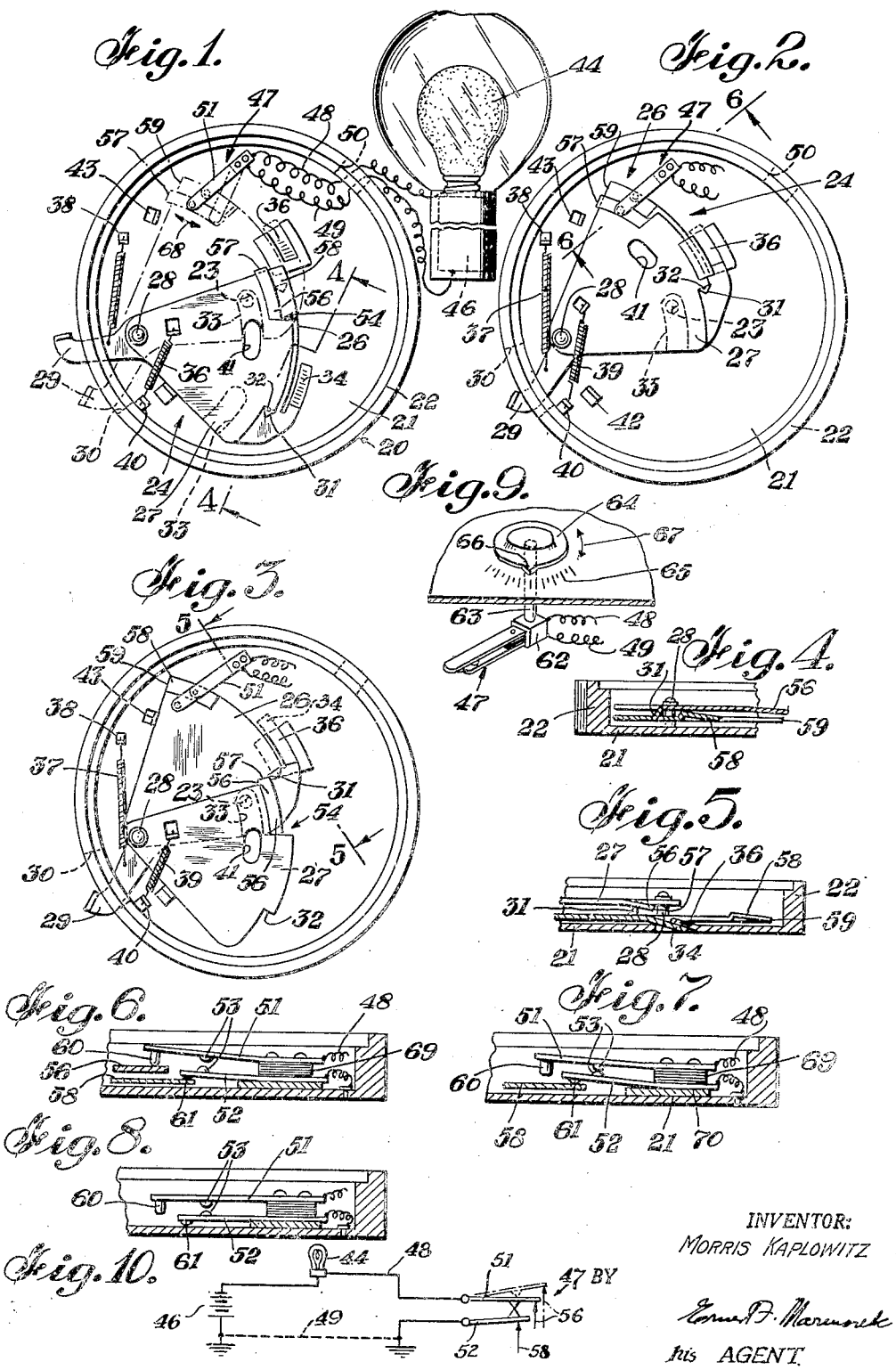

2,498,277

UNITED STATES PATENT OFFICE 2,498,277

CAMERA SHUTTER AND SYNCHRONIZING SWITCH

Morris Kaplowitz, New York, N. Y., assignor to Federal Manufacturing & Engineering Corp., a corporation of New York Application May 21, 1946, Serial No. 671,366

17 Claims. (Cl. 95—11.5)

This invention relates to photography and more particularly to synchronizing arrangements for photographic cameras.

One of the principal objects of the invention is to provide an improved device for synchronizing the actuation of an electrical device with the uncovering of the exposure opening of a camera.

Another object of my invention is the provision of such a device which is controlled by the camera shutter mechanism.

Another object of my invention is to provide such a device in which the exposure blade of the camera shutter controls the instant of closing of an electric circuit after it has started its exposure movement.

Another object of my invention is to provide such a device which maintains the electric circuit closed from the time of exposure until the camera shutter trigger is released by the operator.

Another object is to provide such a device in which the time interval between the instant of closing of the electric circuit and the instant of exposure may be varied by manual adjustment.

Another object is the provision of such a device wherein a normally open switch is first set so that it will automatically close upon release, and is then released.

Further objects and advantages of the invention will be set forth in part in the following specification and in part will be obvious therefrom without being specifically referred to, the same being realized and attained as pointed out in the claims hereof.

All photo-flash-bulbs are characterized by an inherent time lag between the moment of closing of the flash circuit and the instant of flashing, i. e. of attainment of a high degree of illumination by the bulb; this time lag, however, varies for bulbs of different manufacture, and although provisions for a general time lag have been made in synchronizers for all type cameras in the past, heretofore synchronizers for photographic cameras have been provided with means for adjustment to different flash-bulb time lags only for expensive cameras. I have provided an adjusting device of extremely low cost which may be installed even in the most inexpensive camera and which permits to preselect a definite time interval in the synchronizing device to correspond to the inherent time lag of the flash-bulb. Since flash-bulbs are marked by the manufacturer to indicate the amount of time that is needed to bring it to its highest degree of illumination, the operator can pre-set the device accordingly and does not have to leave it to chance whether or not the flashing of the flash-bulb will precisely coincide with the exposure of the camera.

With the above and other objects of the invention in view, the invention consists in the novel construction, arrangement and combination of various devices, elements and parts, as set forth in the claims hereof, certain embodiments of the same being illustrated in the accompanying drawings and described in the specification.

In the accompanying drawings,

Fig. 1 is a plan view of a flash-lamp and a camera shutter casing (the camera not being shown), illustrating the shutter parts in position for an exposure;

Fig. 2 is a view similar to Fig. 1, but with the trigger depressed to the position in which the shutter blade is released to make an exposure;

Fig. 3 is a view similar to Fig. 2, but with the shutter parts in position after an exposure has been made, and before the trigger has been released;

Fig. 4 is a fragmentary sectional view taken along line 4—4 of Fig. 1;

Fig. 5 is a fragmentary sectional view taken along line 5—5 of Fig. 3;

Fig. 6 is an enlarged fragmentary sectional view taken along line 6—6 of Fig. 2;

Fig. 7 is a view similar to Fig. 6, but showing the contact members interengaged;

Fig. 8 is a view similar to Fig. 7, but showing the lower contact member released;

Fig. 9 is a fractional perspective view of a switch and a time interval adjusting mechanism;

Fig. 10 is a diagrammatic view of an electric circuit;

Fig. 11 is a plan view similar to Fig. 1, but showing a modified camera shutter with a battery and a solenoid; and Fig. 12 is a diagrammatic view similar to Fig. 10 of an electric circuit embodying a modification.

In carrying the invention into effect in the embodiments which I have selected for illustration in the accompanying drawings and for description in this specification, I provide a shutter casing 20 for a camera (not shown) which may be mounted on the camera in a well-known manner. The shutter casing 20 has a wall 21 separating it from the interior of the camera, and a circular flange 22 extends from the edge of said wall 21 and projects frontwardly therefrom. An exposure opening 23 is centrally provided in the wall 21 for admitting light to the interior of the camera, upon operation of a shutter mechanism 24. Said shutter mechanism 24 comprises a cover blind 26 and a shutter blade 27 which are movably mounted on a pivot 28. A trigger 29 is secured to said cover blind 26 near the pivot point thereof and extends to the exterior of the shutter casing 20 through a slot 30 in the circular flange 22, for manually operating the shutter mechanism 24. The cover blind 26 is disposed between the wall 21 and the shutter blade 27, and is provided with a latch member 31 which projects upwardly from its surface; said latch member 31 is designed to engage an edge 32 of the shutter blade 27 for latching the cover blind and the shutter blade together for movement in one direction, for setting the shutter blade; subsequently, the shutter blade is unlatched for a movement in the opposite direction, to make an exposure.

The cover blind 26 is furthermore provided with a cutout 33 which is designed to leave the exposure aperture 23 uncovered from the cover blind during the exposure movement of the shutter blade 27. An extension 34 is carried by said cover blind 26 and is bent downwardly for a latching engagement with a slanting projection 36 arranged on the wall 21 and disposed in the path of said extension 34 during the setting movement of the cover blind 26. This latch engagement is best shown in Figs. 3 and 5.

A spring 37 is connected with one end to the cover blind 26 and secured with its other end to a stud 38 which is mounted on the wall 21. A second spring 39 is connected with one end to the shutter blade 27 and secured with its other end to a stud 40 on the wall 21. An arcuate exposure aperture 41 is provided in the shutter blade 27 for uncovering the exposure opening 23 during the exposure movement of the shutter blade. Two stops 42 and 43 project from the wall 21 and are arranged to limit the movement of the cover blind 26 in both directions between two extreme positions, i. e. a rest position and a set position, the stop 42 also serving as abutment for the shutter blade 27 when in a position of rest.

To actuate the shutter, the operator depresses the trigger 29 to move it from the position shown in Fig. 1 in full lines to that shown in dot-and-dash lines and also shown in Fig. 2. During this movement, the trigger 29 will swing the cover blind 26 in a pivotal movement around the pivot 28. The shutter blade 27 is moved at the same time together with the cover blind due to their latching engagement. When the shutter blade has reached its predetermined setting position, shown in Fig. 2, the cover blind 26 has not reached the end of its movement, which is indicated by a gap between the stop 43 and the adjacent edge of the cover blind. At this instant of movement the slanting projection 36 of the wall 21 has engaged the extension 34 and has brought about a lateral depression of the outer portion of the cover blind 26. Thereby, the latch member 31 has been removed from its engagement with the edge 32 and the shutter blade is thus unlatched from the cover blind and is immediately automatically starting the exposure movement under the impulse of the spring 39. The trigger 29 can move the cover blind 26 further for a short distance until the edge thereof abuts against the stop 43, best shown in Fig. 3; this slight move is provided so that the manual movement by the operator does not stop at the instant of release of the shutter blade. As will be apparent, the release of the shutter blade is thus entirely automatic and out of the direct control of the operator.

After the exposure is made, the operator releases the trigger 29 which will thereupon return under the power of the spring 37 to its initial rest position. During the setting movement, as the shutter blade and the cover blind move together, the opening 23 will be covered, and, subsequently will be uncovered only for the relatively short period of time when the exposure aperture 41 registers therewith during the exposure movement of the shutter blade 27. After the exposure has been made, the opening 23 will again remain covered during the return movement of the cover blind 26 (see Fig. 3).

Referring now to Fig. 1, I provide a flashlight arrangement which includes a battery 46, which may be mounted on the exterior of the camera, flash-bulb 44 mounted with relation to said battery and electrically connected thereto, a switch 47, and insulated wires 48 and 49 electrically connecting the switch 47 to the flash-bulb and the battery, respectively.

The switch 47 is mounted on the wall 21 in the interior of the shutter casing 20, and the wires 48 and 49 which are at one end connected to the switch pass through a slot 50 of the flange 22 to the exterior of the casing. The switch 47 comprises two resilient contact members 51 and 52 each having a free, movable end. In the embodiment shown in Figs. 6, 7 and 8, 51 designates an upper contact member and 52 a lower contact member which is arranged parallel to and opposite the upper contact member 51. Each of the contact members is connected to one of the wires and is provided with a contact point 53 facing each other and arranged to conduct current between the wires 48 and 49 when in interengagement (Fig. 7).

The shutter blade 27 is provided with a recess 54 on its outer peripheral edge and has an inclined portion 56 along said recess 54 and ending on one side in a cam edge 57. The cover blind 26 is also provided with an inclined portion, designated 58, which ends in a cam edge 59; said inclined portion 58 is located directly below the recess 54 of the shutter blade when the mechanism 24 is at rest, as well as during the tied setting movement, and both inclined portions are thus adjacent each other.

The upper contact member 51 reaches into the path of said inclined portion 56 of said shutter blade and is located adjacent a position which said inclined portion 56 assumes when the shutter blade has reached its releasing position at the end of its setting movement (Fig. 2). The lower contact member 52, which is arranged parallel to said upper contact member 51, reaches into the path of movement of the inclined portion 58 of said cover blind and is located adjacent a position of said portion 58 of the cover blind, which it assumes when the shutter blade has reached its release position. The upper contact member 51 is provided with a projection 60 made of insulating material, and the lower contact member is provided with an extension 61 which is made of insulating material according to one modification, as explained later on. The two contact members are electrically insulated from each other by an insulator 69.

During the setting movement, the shutter blade as well as the cover blind will raise, by means of their inclined portions 56 and 58, respectively, the free ends of the contact members 51 and 52 while maintaining the two contact points 53 separated. As a matter of fact, the shutter blade will displace with its inclined portion 56 the free end of the upper contact member 51 slightly before the lower contact member 52 undergoes a displacement by the cover blind 26. This assures a constant separation of the contact points 53 and prevents an engagement of the two contact members before the start of the exposure movement of the shutter blade.

After the shutter blade 27 has been released from the latching with the cover blind, it will start on its exposure movement, and after it has moved a short distance, the projection 60 on the upper contact member 51 will slip off the inclined portion 56 at the cam edge 57 and the upper contact point will be brought together with the lower contact point under the influence of the resilience of the upper contact member which causes the free end thereof to move rapidly downward towards the lower contact member; the free end of the lower contact member 52 is no longer at the original spaced position, but is held in its displaced position by the cover blind and the inclined portion 58 thereof, which is best shown in Fig. 7. Although the two contact members are normally separate from each other, an interengagement is possible at this instant, because both members were displaced in the same direction and then the upper member released and, on its return move, comes in engagement with the lower member, which, due to its still effective displacement, is disposed in the return path of the upper member. Thereby, the flash-light circuit will be closed and the flash-bulb will be ignited, as the current flows from the battery 46 through the bulb 44, the upper contact member 51, the lower contact member 52, and back to the battery 46 (see Fig. 10). Upon release of the cover blind by the operator, the lower contact member will slip off the inclined edge 58, and the electric circuit will be broken; thus, the entire mechanism will be ready for a new exposure.

The cam edge 57 releases the upper contact member at an instant which is earlier than the instant of exposure of the opening 23 by the shutter blade, and therefore the switch 47 closes the flash-bulb circuit before the exposure takes place. This time interval is needed to compensate for the normal time lag of the flash-bulb between its energization and its flashing; thereby, the flashing of the flash-bulb will precisely coincide with the exposure of the opening 23.

In order to accommodate this synchronizing arrangement to flash-bulbs of different time lags, I provide an adjusting mechanism. Referring now to Fig. 9, I provide a clasping member 62 which surrounds a portion of the switch 47 and which is secured to the lower end of a pin 63 extending to the exterior of the shutter casing and rotatably held thereby; a knob 64 is located on the exterior of the casing and fastened to the upper end of the pin 63 and is provided with an indicator point 66. On the exterior of the shutter casing a gradation 65 is provided below the indicator point 66 to aid in selecting the position of the knob 64 and thereby of the position of the switch 47. The knob 64 can be turned in both directions, as indicated by an arrow 67, and by this means, the switch 47 can be moved in the shutter casing, as indicated by an arrow 68, between two extreme positions, one shown in full lines and the other in twin dot-and-dash lines in Fig. 1. When the switch is moved to the position shown in full lines, it is set for a comparably longer time interval between the closing of the switch and the exposure of the opening 23, because the free end of the upper contact member 51 will be released after a very short travel of the shutter blade; and when in the position shown in twin dot-and-dash lines, a shorter period of time lag is thereby set, as will be readily understood. The gradation 65 may preferably be indicated in micro-seconds, because flash-bulbs are so marked.

Instead of conducting both insulated electric wires 48 and 49 to the outside as shown in Fig. 1, where the casing is made of metal it is sufficient to conduct the wire 48, which is connected to the upper contact member 51, to the outside of the shutter casing for connection with the flash-bulb 44 and to connect the lower contact member with the wall 21 of the casing 20 (see Figs. 6, 7 and 8), and also to connect one contact of the battery 46 to the shutter casing, thereby connecting the lower contact member with the battery by grounding. Since the two contact members are normally separated from each other by the insulation 69, and the projection 60 on the upper contact member is an insulator, it will in this modified form not be necessary to make the extension 61 out of insulating material because the lower contact member and the cover blind are electrically connected by the wall 21. In both modifications the upper contact member is always insulated from the lower contact member and also from the mass of the shutter casing; the lower contact member, however, in the first form is also insulated from the mass of the shutter casing by an insulating strip 70, and also the extension 61 of the contact member will be made of insulating material; in the second form the strip 70 as well as the extension 61 may be made of conductive material, as pointed out before. In Fig. 10 both modifications are shown simultaneously, with the wire 49 shown in broken lines representing the first modification.

Two further modifications of my synchronizing device are illustrated in Figs. 11 and 12.

My synchronizer may also be used for "bulb"-exposure as the flash circuit will not be interrupted until the cover blind is manually released by the operator. Thus, a simple movable stop of well-known construction (not shown) may be arranged to arrest the exposure movement of the shutter at an instant when its aperture is in register with the opening 23 when it is desired to make a "bulb"-exposure.

Fig. 11 discloses a modified shutter mechanism 80 which may be located in a shutter casing 20 of the type illustrated before, having a wall 21 and a flange 22; the shutter mechanism 80 comprises a shutter blade 81 and a cover blind 82 forming two shutter elements. These two shutter elements are pivotally mounted in the shutter casing 20, but each element is mounted on a different pivot, the shutter blade 81 mounted on a pivot 83 which projects from the wall 21 and the cover blind 82 mounted on a pivot 84 which also projects perpendicularly from the wall 21 and is spaced from said first pivot 83. Said wall 21 is again provided with a central opening 23 for admitting light to the interior of the camera, and the shutter blade 81 is also provided with an exposure aperture 41 for uncovering the opening 23 during the exposure movement of the shutter blade 81. A trigger 29 is fastened to the cover blind 82 and is adapted to be manually operated and to propel the cover blind in one direction for setting the shutter blade 81. Springs 37 and 39 are again provided to return the cover blind and the shutter blade, respectively, to their original positions of rest. Stops 42 and 43 are provided to limit the extreme positions of the cover blind, the stop 42 serving as an abutment for the rest position and the stop 43 for the set position (designated III) of the cover blind.

The operation of the shutter mechanism is similar to the previously described embodiment. When the trigger 29 is depressed, it moves the cover blind from its position of rest (I) and thereby, in turn, drives the shutter blade 81. When the cover blind has reached a position (II) shown in dot-and-dash lines in Fig. 11, the shutter blade 81 which has been latched to the cover blind during the setting movement is unlatched and moves under the impulse of the spring 39 in a direction opposite to the just completed setting move, in an exposure movement, and returns to its original position. The cover blind moves further to a position (III) in which it abuts against the stop 43. As in the previous embodiment, the release of the shutter blade is removed from the control of the operator and is entirely automatic.

In order to effect the setting of the shutter blade 81 by the drive of the cover blind 82, I provide a latching engagement which includes a pin 84 secured to the underside of the shutter blade 81 and a latch 86 on the outer edge of the cover blind; said latch 86, during the setting movement of the cover blind, will engage the pin 84 with a front portion 88 and will thereby drive the shutter blade to a predetermined set position. After the shutter blade has reached the predetermined position (shown in dot-and-dash lines in Fig. 11) the pin 84 will be unlatched from its engagement with the latch 86 of the cover blind; in order to bring about such an unlatching, the latch 86 is provided with a recessed surface 87, adjacent the front portion 88, which will permit the pin 84 to be released in the set position from the latch 86, thereby releasing the shutter blade for its exposure movement. The rear portion of the latch 86 which is disposed opposite the pin-engaging front portion, is bent downwardly (not shown in detail in the drawing) to clear the pin during the return movement of the cover blind 82, when the shutter blade is already in a position of rest. Thus, the latch 86 will slide over the head of the pin and the cover blind 82 will assume its rest position (I).

A switch 89 is shown which comprises two resilient contact members 90 and 91, respectively, which are arranged on an insulator plate 85 which is slidably mounted on the wall 21 by means of two slot-and-pin connections. Said plate 85 is adjustable on the wall 21 for varying the position of the contact members with relation to the set position of the cover blind and shutter blade. The adjustment may be carried out by means of an arm 95 which extends to the exterior of the shutter casing; the adjustment is not shown in detail and may be effectuated in any well-known suitable manner. The contact member 90 is arranged near the set position of the cover blind 82, and the contact member 91 is located near the set position of the shutter blade 81. Each contact member is provided with a free, displaceable end, carrying a contact point 53 and said contact points are facing each other and are normally separated from each other. The contact member 90 carries an insulator 90a and the contact member 91 carries an insulator 91a.

On the cover blind 82 I provide a cam edge 92 which is adapted to bear against the insulator 90a of the contact member 90, since the latter reaches into the path of the setting movement of the former. When the cam edge 92 strikes against the contact member 90, it will move the free end thereof for the purpose of displacement. The contact member 91 reaches into the path of a cam edge 93 of the shutter blade 81 and will be displaced by the same during the setting movement when it bears against the insulator 91a.

When the operator actuates the shutter mechanism by depressing the trigger 29, the cover blind will move the shutter blade to a predetermined setting position and, thereby, the free ends of both contact members 90 and 91, respectively, will be displaced while the two contact points 53 thereof will be maintained in separated relation. Similar to the previous embodiment, upon unlatching of the shutter blade the same will start on its exposure movement under the impulse of the spring 39 and will thus release the contact member 91. Said contact member 91, upon release will move towards its original position under the power of its own resilience and will interengage the contact member 90 since the latter is still held in a displaced position by the cover blind 82. The contact member 90 is shown to be not entirely straight, but bent so that when the cover blind moves from the position (II) of release of the shutter blade to the final setting position (III), the contact member 90 will change its position of displacement only slightly.

Insulated wires 94 and 96 are electrically connected to the contact members 90 and 91, respectively, and extend to the exterior of the shutter casing.

In the description of the previous figures the synchronizing arrangement has been described in connection with the actuation of a flash-bulb. However, my synchronizer may also be used with other electrical devices and I have outlined below, by way of exemplification, further uses to which my synchronizer may be put.

As shown in Fig. 11, a solenoid 97 may be energized from the battery 46 and may perform a mechanical operation upon closing of the switch 89, since the battery 46, the switch 89 and the solenoid 97 are electrically interconnected by means of wires 94, 96 and 98, as illustrated.

The solenoid may, for example, be utilized to close a switch for a second electric circuit for actuating an electronic flasher; or it may be utilized to operate a mechanical device, such as the trigger of a rifle, for photographically recording the action of a rifle bullet; similarly, the camera may be synchronized, by means of the solenoid 97 with a variety of devices where such synchronization is desired.

In Fig. 11 a mechanical device is represented by the fragmentary illustration of an arm 99 which is not shown in greater detail. When the solenoid 97 is energized, the movable core thereof will move from the position in full lines to that in dot-and-dash lines, and the arm 99 will be driven accordingly.

In Fig. 12 a wiring diagram is shown in which the synchronizer actuates a relay 100 for closing a switch 101 of a separate electric circuit 102. An electrical device is diagrammatically illustrated in the circuit and designated 103 and represents an electronic flasher or other electronic device to be synchronized with the shutter exposure.

I do not limit myself to the particular details of construction set forth in the foregoing specification and illustrated in the accompanying drawings, as the same refer to and set forth only certain embodiments of the invention and it is obvious that the same may be modified, within the scope of the appended claims, without departing from the spirit and scope of the invention.

Having thus described the invention, what I claim as new and desire to be secured by Letters Patent is as follows:

1. In a synchronizing arrangement for cameras, the combination with a shutter casing having an exposure opening therein and an electric circuit for actuating an electrical device, of a movable shutter having two parts normally in a rest position and one part adapted to cooperate with the other to cover and to uncover said exposure opening and including two movable elements each operable by a part, and switch means for said circuit disposed within said shutter casing and including two contacts separated from said shutter elements and parts while the latter are in rest position and arranged, after the shutter parts have been moved from their rest positions, first each to be engaged by an element and moved in one direction to be set for release and thereafter one contact to be released by its element to interengage the other contact substantially at the instant of exposure by said one part for synchronizing the actuation of the electrical device with the uncovering of said exposure opening.

2. In a synchronizing arrangement for cameras, the combination with a camera shutter casing having an opening therein for admitting light to the camera interior, an electric circuit including an electrical device adapted to be actuated by current from said circuit, of a movable shutter mechanism arranged to cover and to expose said opening including two movable exposure parts cooperating to effectuate exposure, two movable elements each operable by an exposure part, means for synchronizing the exposure by the shutter mechanism of said opening with the actuation of said electrical device comprising a switch for said circuit, said switch disposed in said shutter casing and including two movable normally separated contact members, said elements so arranged as to engage and to move first said contact members in one direction while maintaining them separated throughout the movement thereof and then to release one contact member, and means adapted to move said released contact member in an opposite direction into engagement with the other contact member, thereby closing said switch.

3. In a synchronizing arrangement for cameras, the combination with a camera shutter casing having an opening therein for admitting light to the camera interior, an electric circuit including an electrical device adapted to be actuated by current from said circuit, of a movable shutter mechanism arranged to cover and to expose said opening including two movable exposure parts cooperating to effectuate exposure, two movable elements each operable by an exposure part, means for synchronizing the exposure by the shutter mechanism of said opening with the actuation of said electrical device comprising a switch for said circuit, said switch disposed in said shutter casing and including two movable normally separated contact members, cam means on each of said elements so arranged as to engage and to move first said contact members in one direction while maintaining them separated throughout the movement thereof and then to release one contact member, and means adapted to move said released contact member in an opposite direction towards the original position thereof for engaging the other contact member, thereby closing said switch.

4. In a synchronizing arrangement for cameras, the combination with a camera shutter casing having an opening therein for admitting light to the camera interior, an electric circuit including an electrical device adapted to be actuated by current from said ciruit, of a movable shutter mechanism arranged to cover and to expose said opening including two movable exposure parts cooperating to effectuate exposure, two movable elements each operable by an exposure part, means for synchronizing the exposure by the shutter mechanism of said opening with the actuation of said electrical device comprising a switch for said circuit, said switch disposed in said shutter casing and including two oppositely arranged movable contact members, each contact member having a free movable end normally separated from and facing the free end of the other contact member and adapted to be moved for engaging the same for closing said circuit, said elements so arranged as first to move for displacement the free end of each contact member in one direction while maintaining said ends separated throughout the displacement movement thereof, said movement extending for a distance sufficient to place the free end of one member in a position disposed in the displacement path of the free end of said other member and then to release the free end of said other contact member, and means adapted to move said released free end towards the displaced end of said one contact member for engaging the same, thereby closing said circuit.

5. In a synchronizing arrangement for cameras, the combination with a shutter casing having an exposure opening therein, of a shutter mechanism adapted to cover and to uncover said exposure opening comprising a manually operable movable element, a second movable element cooperating therewith to effectuate exposure, latching means for moving said second element in one direction by said first element to a position where the same is unlatched from said first element, motor means connected to said second element for moving it in the opposite direction after it has been unlatched, an electric circuit, switch means for said circuit disposed in said shutter casing comprising two movable, normally open, resilient contact members each arranged to cooperate with an element for first moving both contact members in a direction in open relation when said first element moves said second element in said one direction and then releasing one contact member after said second element has been unlatched and started to move in the said opposite direction to make an exposure, for interengaging said contact members.

6. In a synchronizing arrangement for cameras, the combination with a shutter casing having an exposure opening therein, of a shutter mechanism adapted to cover and to uncover said exposure opening comprising a manually operable movable element, a second movable element cooperating therewith to effectuate exposure, latching means for moving said second element in one direction by said first element, means for unlatching said second element after it has been moved to a predetermined position, motor means connected to said second element for moving it in the opposite direction after it has been unlatched, an electric circuit, switch means for said circuit disposed in said shutter casing comprising two movable, normally open, resilient contact members each arranged to cooperate with an element for first moving both contact members in open and substantially parallel relation when said first element moves said second element in said one direction and then releasing one contact member after said second element has been unlatched and started to move in the opposite direction to make an exposure, for interengaging said contact members.

7. In a synchronizing arrangement for cameras, the combination with a shutter casing having an exposure opening therein, of a shutter mechanism comprising a movable element, a second movable element cooperating therewith to effectuate exposure, a spring connected to said first element, a second spring connected to said second element, and means for latching said elements for moving said second element by said first element, means for automatically unlatching said second element from said first element, an electric circuit, switch means for said circuit disposed in said shutter casing adjacent said elements comprising two resilient normally separated contact members each arranged to cooperate with an element during movement thereof for engagement of said contact members by said elements for a unidirectional displacement of said contact members, while maintaining them spaced from each other, and a subsequent release of one contact member by said second element after said second element has been unlatched from said first element, whereby said contact members will be interengaged.

8. In a synchronizing arrangement for cameras, the combination with a camera shutter casing having an opening therein for admitting light to the camera interior, a source of electric current, and an electric circuit of a movable shutter blade arranged to cover and to expose said opening, a trigger, a cover blind movable by said trigger, a motor connected to said shutter blade for returning the same to the original position thereof, a second motor connected to said cover blind, means for latching said cover blind and shutter blade for moving the shutter blade by the cover blind, means for unlatching the shutter blade from the cover blind after it has been moved to a predetermined position, switch means for said circuit disposed in said shutter casing including two movable normally separated contact members, cam means operable by said shutter blade, second cam means operable by said cover blind, said first and said second cam means adapted to cooperate with said contact members and arranged first to move both contact members in one direction while maintaining them separated throughout the movement and then to release a contact member, and means adapted to move said released contact member in an opposite direction towards its original position for engaging the other contact member, thereby closing said circuit.

9. In a synchronizing arrangement for cameras, the combination with a shutter casing having an exposure opening therein, of a shutter mechanism adapted to cover and to uncover said exposure opening comprising a shutter blade movable in opposite directions and arranged to cover and to expose said opening, a trigger, a cover blind movable by said trigger, a motor connected to said shutter blade for returning it to its original position, a second motor connected to said cover blind, means for latching said cover blind and shutter blade for moving the shutter blade by the cover blind in one direction, means for unlatching the shutter blade from the cover blind after it has been moved to a predetermined position, an electric circuit switch means for said circuit disposed in said shutter casing comprising two movable normally open resilient contact members, one of said contact members arranged to cooperate with the shutter blade and the second contact member arranged to cooperate with the cover blind for initially moving both contact members in open and substantially parallel relation when said shutter blade is moved by said cover blind in said one direction and then releasing said first contact member after said shutter blade has been unlatched and has started to move in the opposite direction, for engaging said second contact member by said first member, thereby closing said circuit.

10. In a synchronizing arrangement for cameras, the combination with a camera shutter casing having an opening therein for admitting light to the camera interior, an electric circuit including an electrical device adapted to be actuated by current from said circuit, of a movable shutter mechanism arranged to cover and to expose said opening including two movable exposure parts cooperating to effectuate exposure, two movable elements each operable by an exposure part, means for synchronizing the exposure by the shutter mechanism of said opening with the actuation of said electrical device comprising a switch for said circuit, said switch disposed in said shutter casing and including two movable normally separated contact members, said elements so arranged as to engage and to move first said contact members in one direction while maintaining them separated throughout the movement thereof and then to release one contact member, means adapted to move said released contact member in an opposite direction into engagement with the other contact member, thereby closing said switch, and means for adjusting the position of said resilient contact members with relation to said elements for varying the time of closing of said switch means relative to the time of the uncovering of said exposure opening.

11. In a synchronizing arrangement for cameras, the combination with a camera shutter casing having an opening therein for admitting light to the camera interior, an electric circuit including an electrical device adapted to be actuated by current from said circuit, of a movable shutter mechanism arranged to cover and to expose said opening, two elements connected to said shutter mechanism and movable therewith and cooperating to effectuate exposure, means for synchronizing the exposure by the shutter mechanism of said opening with the actuation of said electrical device comprising a switch for said circuit, said switch disposed in said shutter casing and including two movable resilient normally separated contact members, said elements so arranged as to engage and to move first said contact members in one direction while maintaining them separated throughout the movement thereof and then to release one contact member to move under the impulse of its own resilience in an opposite direction towards its original position for engaging the other contact member, thereby closing said switch, and means for adjusting the position of said resilient members with relation to said elements comprising a clasping member in said shutter casing surrounding partially said contact members and a knob secured with relation to said clasping member and disposed on the exterior of said shutter casing having an indicator for preselecting the position of said contact members, for varying the time of closing of said switch means relative to the time of the uncovering of said exposure opening.

12. In a synchronizing arrangement for cameras, the combination with a camera shutter casing including a separating wall having an opening therein for admitting light to the camera interior, a source of electric current, and an electrical device adapted to be actuated by current from said source, of a movable shutter mechanism arranged to cover and to expose said opening comprising two elements, means for synchronizing the exposure by the shutter mechanism of said opening with the actuation of said electrical device comprising a switch disposed in said shutter casing and mounted on said wall thereof, said switch including two oppositely arranged movable and resilient normally separated contact members, said shutter casing being interconnected electrically to said source of electric current and to one of said contact members, means for insulating said second contact member from said first contact member, said second contact member being interconnected electrically to said device for providing a circuit arranged to conduct electric current from said source through said device upon closing of said switch, and cam means operated by said shutter mechanism and being insulated from said second contact member and so arranged as to move first both contact members in one direction while maintaining them separated throughout the movement thereof and then to release a contact member to move under the impulse of its own resilience in an opposite direction towards its initial position for engaging the opposite contact member, thereby closing said switch.

13. In a synchronizing arrangement for cameras, the combination with a shutter casing having an exposure opening therein, of a shutter mechanism adapted to cover and to uncover said exposure opening comprising a manually operable movable element, a second movable element cooperating therewith to effective exposure, latching means for moving said second element in one direction by said first element, means for unlatching said second element after it has been moved to a predetermined position, and motor means connected to said second element for moving it in the opposite direction, an electric circuit, switch means for said circuit disposed in said shutter casing near said predetermined position of said second element, said switch means comprising two movable, normally open, resilient contact members each arranged to cooperate with an element for first moving both contact members in open substantially parallel relation when said first element moves said second element in said one direction and then releasing one contact member after said second element has been unlatched and started to move in the opposite direction, for interengaging said contact members and thereby closing said switch means, and means cooperating with said switch means and operable to adjust the position thereof with relation to said predetermined position of said second element for varying the time interval between the instant of closing of the switch means and the instant of uncovering of said exposure opening.

14. In a synchronizing arrangement for cameras, the combination with a camera shutter casing having an opening therein for admitting light to the camera interior, and an electric circuit, of a movable shutter blade arranged to cover and to expose said opening, a trigger, a cover blind movable by said trigger, a motor connected to said shutter blade for returning it to its original position, a second motor connected to said cover blind, latching means between said cover blind and shutter blade for moving the shutter blade by the cover blind, means for unlatching the shutter blade from the cover blind after it has been moved to a predetermined position, switch means for said circuit disposed in said shutter casing including two movable resilient normally separated contact members, cam means carried by said shutter blade, second cam means carried by said cover blind, said first and said second cam means adapted to cooperate with said contact members and arranged first to move both contact members in one direction while maintaining them separated throughout the movement and then to release a contact member to move under the impulse of its own resilience in an opposite direction towards its initial position for engaging the other contact member, thereby closing said switch, and means manually operable from the exterior of said casing for adjusting the position of said two contact members, in relation to the position of said first cam means when said shutter blade has been moved to said predetermined position, for changing the time interval between the instant of closing of said switch and the instant of exposure of said opening.

15. In a synchronizing arrangement for cameras, the combination with a camera shutter casing including a wall having an opening therein for admitting light to the camera interior, an electric circuit including a source of electric current, and an electrical device adapted to be actuated by current from said source, of two spaced parallel pivots projecting from said wall, a shutter blade having an exposure opening therein mounted on one of said pivots, a cover blind mounted on the other pivot, a trigger attached thereto, means for latching the blade and cover blind together for movement of the blade from a rest position, a spring tending to move the shutter blade towards the rest position, means for releasing the shutter blade from the cover blind to permit movement of the blade for making an exposure, switch means for said circuit disposed in said casing comprising two contact members mounted on said casing wall and normally separated and each resiliently movable in a direction transverse with relation to the axes of said pivots, one of said contact members arranged to cooperate with the shutter blade and the second contact member arranged to cooperate with the cover blind for initially moving both contact members in substantially parallel and open relation in said transverse direction when said shutter blade is moved by said cover blind and then releasing said first contact member after said shutter blade has been unlatched and has started to move towards the rest position, for engaging said second contact member by said first member, thereby closing said switch means.

16. In a synchronizing arrangement for cameras, the combination with a camera shutter casing including a wall having an opening therein for admitting light to the camera interior, an electric circuit including a source of electric current, and an electrical device adapted to be actuated by current from said source, of a pivot projecting from said wall, a shutter blade having an exposure opening therein mounted on said pivot, a movable cover blind, a trigger attached thereto, means for latching the blade and cover blind for movement of the blade from a rest position, a spring tending to return the shutter blade to the rest position, means for releasing the shutter blade from the cover blind to permit movement of the blade for making an exposure, switch means for said circuit disposed in said casing comprising two contact members mounted on said casing wall and normally separated and each resiliently movable in an axial direction with relation to said pivot, one of said contact members arranged to cooperate with the shutter blade and the second contact member arranged to cooperate with the cover blind for initially moving both contact members in substantially parallel and open relation in said axial direction when said shutter blade is moved by said cover blind and then releasing said first contact member after said shutter blade has been unlatched and has started to move towards said rest position, for engaging said second contact member by said first member, thereby closing said switch means.

17. In a synchronizing arrangement, for use in connection with a camera shutter including two cooperating movable parts adapted to cover and to uncover an exposure opening and an electric circuit for actuating an electrical device, in combination, a switch for said circuit and two switch operating elements connected to said shutter and each element operable by a part, said operating elements reciprocably movable along a predetermined path and normally disposed in a rest position at one end of said path, said switch including two movable operating members extending to said path at a point thereof spaced from said rest position to be entirely remote from said operating elements at rest, said operating elements arranged to be moved by said parts from said rest position and to engage said switch members for first moving both members in one direction for setting said switch and subsequently releasing one member to move in an opposite direction to interengage the other member to close said circuit for actuating the electrical device in synchronism with the uncovering of said exposure opening.

MORRIS KAPLOWITZ.

REFERENCES CITED

The following references are of record in the file of this patent:

UNITED STATES PATENTS

| Number | Name | Date |
| --- | --- | --- |
| 594,306 | Williams | Nov. 23, 1897 |
| 1,133,963 | Hoover | Mar. 30, 1915 |
| 1,954,673 | Krupnick et al. | Apr. 10, 1934 |
| 2,119,712 | Koszalka | June 7, 1938 |
| 2,206,811 | Drotning et al. | July 2, 1940 |
| 2,282,850 | Brownscome | May 12, 1942 |

FOREIGN PATENTS

| Number | Country | Date |
| --- | --- | --- |
| 462,953 | Great Britain | Mar. 18, 1937 |